(12) United States Patent
Chen

(10) Patent No.: US 8,107,139 B2
(45) Date of Patent: *Jan. 31, 2012

(54) COLOR ADJUSTING APPARATUS AND METHOD FOR LIGHT SOURCE

(75) Inventor: Pi-Chen Chen, Taipei (TW)

(73) Assignee: Transpacific Plasma, LLC, Wilmington, DE (US)

( * ) Notice: Subject to any disclaimer, the term of this patent is extended or adjusted under 35 U.S.C. 154(b) by 1184 days.

This patent is subject to a terminal disclaimer.

(21) Appl. No.: 11/835,859

(22) Filed: Aug. 8, 2007

(65) Prior Publication Data

US 2007/0268532 A1 Nov. 22, 2007

Related U.S. Application Data

(62) Division of application No. 10/064,559, filed on Jul. 26, 2002, now abandoned.

(30) Foreign Application Priority Data

Mar. 18, 2002 (TW) ................................ 91105037 A

(51) Int. Cl.
*H04N 1/46* (2006.01)
(52) U.S. Cl. ........ 358/509; 358/474; 358/475; 358/486; 358/501; 382/254; 382/275
(58) Field of Classification Search .................. 358/474, 358/475, 486, 497, 496, 509, 501, 505, 512, 358/515, 518; 382/254, 274, 275
See application file for complete search history.

(56) References Cited

U.S. PATENT DOCUMENTS

| | | | |
|---|---|---|---|
| 3,509,345 A * | 4/1970 | Astheimer | 250/316.1 |
| 4,383,758 A | 5/1983 | Honda et al. | |
| 4,437,112 A | 3/1984 | Tanaka et al. | |
| 4,691,228 A | 9/1987 | Nagano | |
| 4,698,669 A | 10/1987 | Sekizawa et al. | |
| 4,926,250 A * | 5/1990 | Konishi | 358/501 |
| 4,952,972 A | 8/1990 | Someya | |
| 5,126,856 A | 6/1992 | Abe | |
| 5,241,378 A * | 8/1993 | Nishiguchi | 358/500 |
| 5,282,046 A * | 1/1994 | Yamaguchi | 358/296 |
| 5,495,329 A | 2/1996 | Anderson, II et al. | |
| 5,910,937 A * | 6/1999 | Akiba et al. | 369/53.2 |
| 5,920,408 A | 7/1999 | Nagano | |
| 6,043,907 A * | 3/2000 | Okino | 358/475 |
| 6,051,826 A * | 4/2000 | Arimoto et al. | 250/208.1 |
| 6,188,501 B1 * | 2/2001 | Neushul | 359/196.1 |

(Continued)

OTHER PUBLICATIONS

U.S. Appl. No. 11/835,888, Mail date Oct. 6, 2010, Office Action.

*Primary Examiner* — Negussie Worku
(74) *Attorney, Agent, or Firm* — Perkins Coie LLP

(57) ABSTRACT

Color adjusting apparatus and method for a light source. A reflector of a required color is added to a light source of a scan module, a plating film of the required color is formed on a lens, or the lens is dyed with the required color. Or alternatively, the color of the light source is directly changed into the required color. As a result, the inconsistent intensities for the light in the primary color, red, green and blue output from the charge-coupled device caused by different brightness of the light source, different wavelength transmission of the lens, and different light sensitivity of the charge-coupled device is improved.

18 Claims, 5 Drawing Sheets

U.S. PATENT DOCUMENTS

| | | | |
|---|---|---|---|
| 6,633,415 B1 * | 10/2003 | Arafune et al. | 358/474 |
| 6,734,993 B1 * | 5/2004 | Damm et al. | 358/471 |
| 6,760,096 B2 * | 7/2004 | Kitabayashi et al. | 356/124 |
| 6,792,161 B1 * | 9/2004 | Imaizumi et al. | 382/275 |
| 6,906,830 B1 * | 6/2005 | Hayashi | 358/474 |
| 7,023,587 B2 * | 4/2006 | Ikeda | 358/474 |
| 7,349,132 B2 * | 3/2008 | Ide | 358/474 |
| 7,724,402 B2 * | 5/2010 | Ichikawa et al. | 358/474 |
| 7,791,771 B2 * | 9/2010 | Shiraishi | 358/475 |
| 7,843,610 B2 * | 11/2010 | Hoshi | 358/474 |
| 7,864,383 B2 * | 1/2011 | Shiraishi | 358/474 |
| 2006/0077479 A1 * | 4/2006 | Itou | 358/474 |
| 2007/0111233 A1 * | 5/2007 | Bianchi et al. | 435/6 |
| 2007/0216969 A1 * | 9/2007 | Nishina | 358/509 |
| 2007/0229712 A1 * | 10/2007 | Uota | 348/674 |
| 2007/0273940 A1 | 11/2007 | Chen | |
| 2008/0043295 A1 * | 2/2008 | Sakakibara | 358/474 |

* cited by examiner

COLOR ADJUSTING APPARATUS AND METHOD FOR LIGHT SOURCE

CROSS REFERENCE TO RELATED APPLICATIONS

This application is a first divisional application of and commonly assigned application Ser. No. 10/064,559, filed on Jul. 26, 2002 now abandoned, which claims the priority benefit of Taiwan application serial no. 91105037, filed on Mar. 18, 2002.

BACKGROUND OF INVENTION

1. Field of the Invention

The invention relates in general to a color adjusting apparatus and method for a light source. More particularly, the invention relates to a color adjusting apparatus and method of use for a light source of an optical scan module.

2. Related Art of the Invention

As image input, operation and processing have caused popular interest, the scanner becomes a basic accessory for many computer users. Through the scanner, text or graphs in documents, magazines, books or pictures can be scanned and input into a computer for further processing. The platform scanner is the most common type among various kinds of scanners. In the platform scanner, the scan module, installed under a transparent platform, can be pulled back and forth to scan the document on the transparent platform. The scan module itself does not have a driving mechanism, so the driving mechanism such as a motor, gear, and belt are required. While using the platform scanner to scan a document, the document has to be disposed on the transparent platform and covered with a lid, which presses the document down on the transparent platform.

The conventional scan module 700 of an optical scanner (referring to FIG. 1) includes a light source 100, a mirror set 400, a lens set 500 and an optical detector such as charge-coupled device (CCD) 600. While performing a scan, the light source (such as a light tube) 100 radiates on the document 200 disposed on the light transparent board 300 (which is the transparent platform). An imaging light 110 is obtained via reflection (where the light source 100 is located underneath the light transparent board 300) or transmission (where the light source 100 is located over the light transparent board 300). The mirror set 400 is an assembly of multiple mirrors 401, 402, 403 and is located along the optical path of the imaging light 110. The image of the document 200 directed to the mirror set 400 is reflected to the lens set 500 thereby. Through the lens set 500, the imaging light 110 of the document 200 is incident and displayed on the charge-coupled device 600.

The light source 100 of the optical scan module 700 is a very important device for the whole optical system. The light emitted by the light source 100 generates various intensities according to the frequency thereof. Through the function of the charge-coupled device 600, for example, after inspection of modulation transfer function (MTF), a certain degree of color deviation often results. Therefore, compensation and correction in a firmware for each scan step is required to obtain the correct color. This is very costly and time consuming.

The function of the lens set 500 is to display the imaging light 100 on the charge-coupled device 600. That is, the light signal collected by the lens set 500 is the material source that all the subsequent devices are processing. Therefore, the correctness of the light signal is crucial. Generally speaking, as shown in FIG. 2, the lens set 500 is a composite signal lens consisting of a plurality of lenses, for example, the lenses 510, 520 and 530 as shown in FIG. 1 and installed in the lens holder 710. Using lenses with different materials or curvatures, the aberration caused by a single lens is corrected. However, as the wavelength transmission for the lenses 510, 520 and 530 is different, inconsistent output intensities in the primary colors red, green and blue of the charge-couple device 600 results.

Further, the charge-coupled device 600 comprises thousands of optoelectronic diodes (pixels) arranged in straight lines. Each optoelectronic diode comprises three detectors to receive the red, green and blue color light signals, respectively. In the scanning operation, the charge-coupled device 600 outputs analog red, green and blue electronic signals for the light received in each sequence. By analog-to-digital conversion, the converted signals are then transmitted to the subsequent devices for processing. The detectors of the charge-coupled device 600 do not detect only one single primary color signal. Therefore, frequency response of mutual interference between color signals occurs. The light sensitivity of the charge-coupled device 600 is degraded due to different light sensitivity generated for different colors, increased scan moving speed of the charge-coupled device 600 and decrease of exposure amount. Accordingly, inconsistent output intensities for red, green and blue light are generated by the charge-coupled device 600.

SUMMARY OF INVENTION

The present invention provides a color adjusting apparatus and method. A reflector with a required color is added to a light source of a scan module. A plating film with the required color is formed on a lens. Or alternatively, the light source is directly switched to the required color. Thus, the inconsistent output intensities for the three primary colors, red, green and blue light, of the charge-coupled device caused by different brightness of the light source, different wavelength transmission of the lens and the different light sensitivities of the charge-coupled device is improved.

The color adjusting method provided by the present invention is applied to an optical scan module. The optical scan module includes at least a light source, a mirror set, a lens set and an optical detector. The light source is used to radiate a document to obtain an imaging light. The mirror set is disposed along an optical path of the imaging light. Thereby, the imaging light is projected to the optical detector. The lens set is located along the optical path between the optical detector and the mirror lens set. The color adjusting method includes the following steps.

A reflector is provided and allocated at an opposing side of the side where the light source radiates the document. The color of the reflector is selected from red, green or blue. Through the reflector, the intensity of the selected color of the light source is enhanced.

Alternatively, a light transparent plating film is formed on a surface of the lens by evaporation plating. The light transparent plating film has a color selected from a group consisting of red, green and blue colors. Therefore, the intensity of the selected color of the light source is enhanced.

The lens may also be dyed to have a specific color selected from a group consisting of red, green and blue colors.

In yet another alternative embodiment, the original light source can be replaced by a color adjusted light source. The color of the adjusted light source can be selected from a group consisting of red, green and blue light sources, such that the intensity of the light source with the selected color is enhanced.

Accordingly, the inconsistent output intensities for the primary colors red, green and blue of the charge-coupled device can be improved.

The present invention further provides a color adjusting apparatus for an optical scan module. The optical scan module comprises at least a light source, a reflection mirror set, a lens set and an optical detector. The light source is used to radiate a document, so as to obtain an imaging light. The reflection mirror set is located at an optical path of the imaging light to direct the imaging light incident onto the optical detector. The lens set is allocated at the optical path between the optical detector and the reflection mirror. The light adjusting apparatus further comprises a reflector, of which the color is selected from a group consisting of red color, green color and blue color.

Alternatively, the color adjusting apparatus further comprises a transparent plating film formed on a surface of the lens set. The color of the transparent plating film is selected from a group consisting of red color, green color and blue color.

The present invention further provides an optical scan module applicable for scanning a document. The optical scan module comprises at least a light source, a reflector, a reflection mirror set, a lens set and an optical detector.

The light source is used to radiate a document, so as to obtain an imaging light. The reflector is allocated at one side opposing the side where the light source radiates the document. The color of the reflector is selected from a group consisting of red color, green color and blue color, such that the intensity of the selected color is increased. The reflection mirror set is located on an optical path of the imaging light to receive and reflect the imaging light. The lens set is allocated along the optical path to allow the imaging light reflected from the reflection mirror set to pass therethrough. The optical detector is allocated along the optical path, so as to receive the imaging light passing through the lens set.

The lens set comprises at least one lens, on which a transparent plating film is formed by evaporation plating. The color of the transparent plating film is selected from a group consisting of red color, green color and blue color.

The lens may also be dyed into a color selected from a group consisting of red, green and blue colors.

Alternatively, the light source may have a color selected from a group consisting of red, green and blue colors.

Accordingly, the present invention uses a reflector, a lens or a light source with a specific color to improve the performance of the light source in such specific color. Therefore, the inconsistent output intensities for any specific colors (such as red, green and blue colors) of the charge-coupled device are improved.

The present invention directly improves the performance of the light source in a specific color, so that the step of compensation and correction following each scan is avoided to reduce fabrication time and cost.

BRIEF DESCRIPTION OF DRAWINGS

These, as well as other features of the present invention, will become more apparent upon reference to the drawings wherein.

DETAILED DESCRIPTION

First Embodiment

Figure 1:
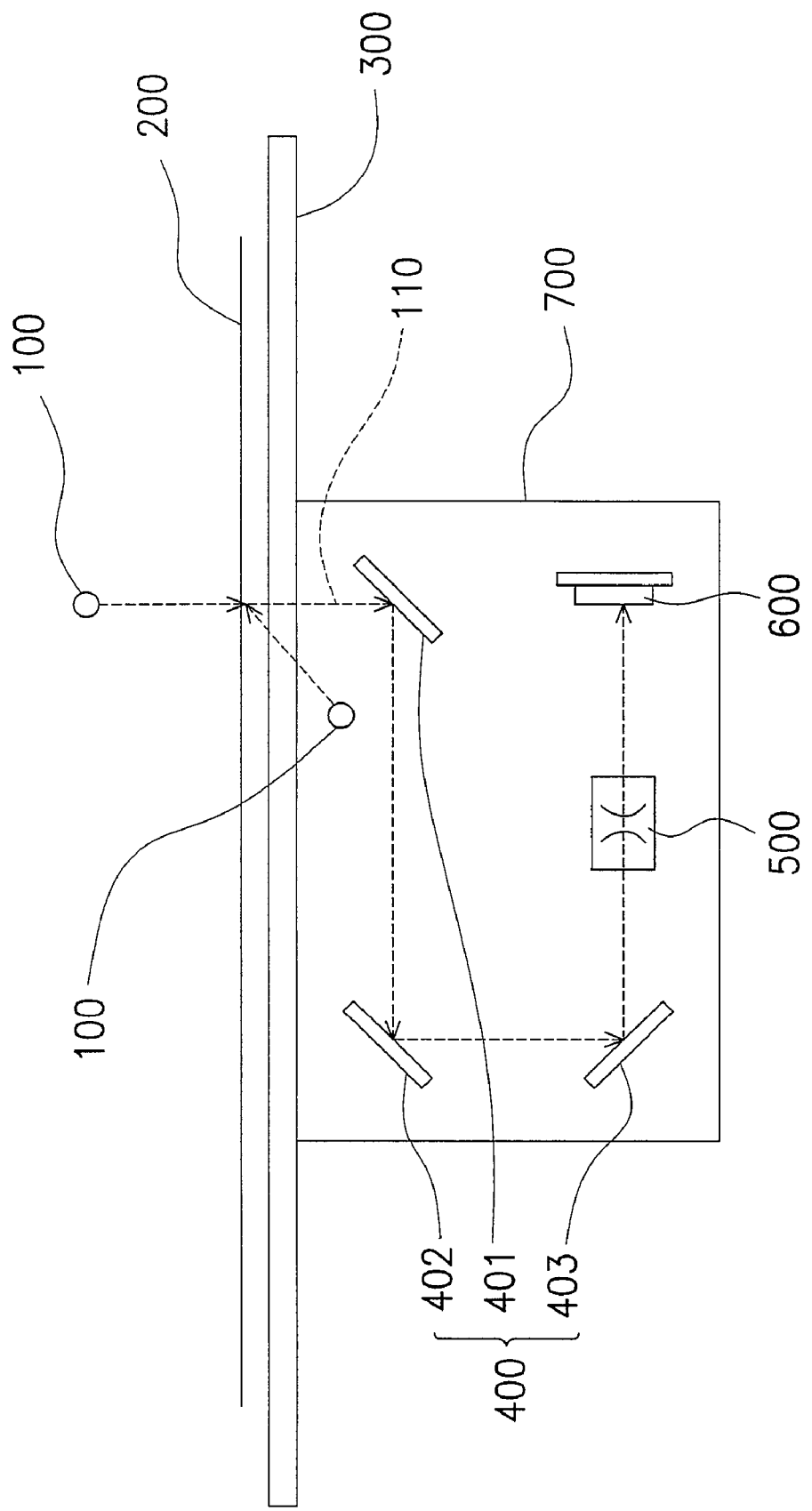
FIG. 1 is a cross-sectional view of a conventional optical scan module.
Figure 2:
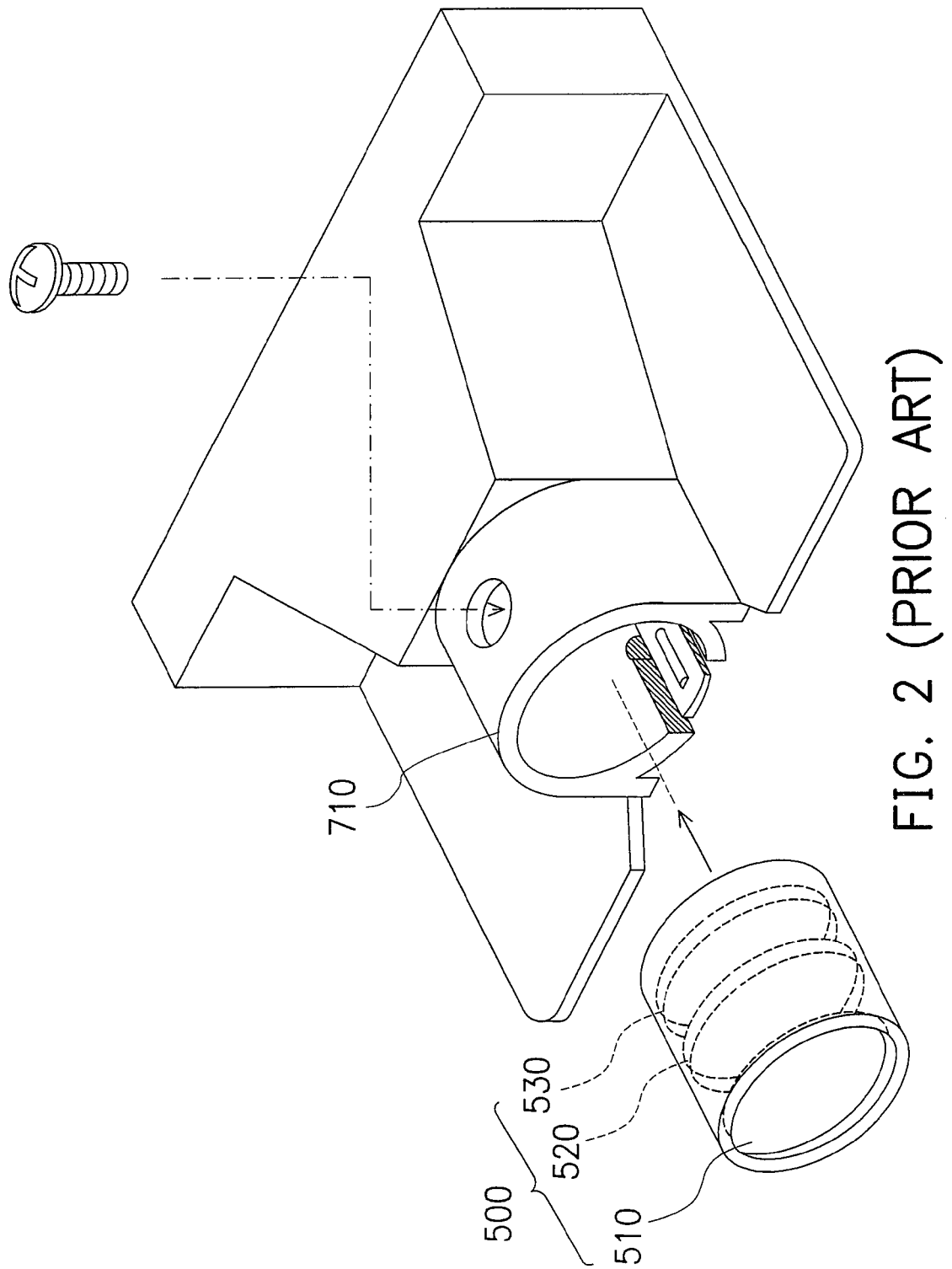
FIG. 2 shows a perspective view of a lens set of a conventional optical scan module.
Figure 3:
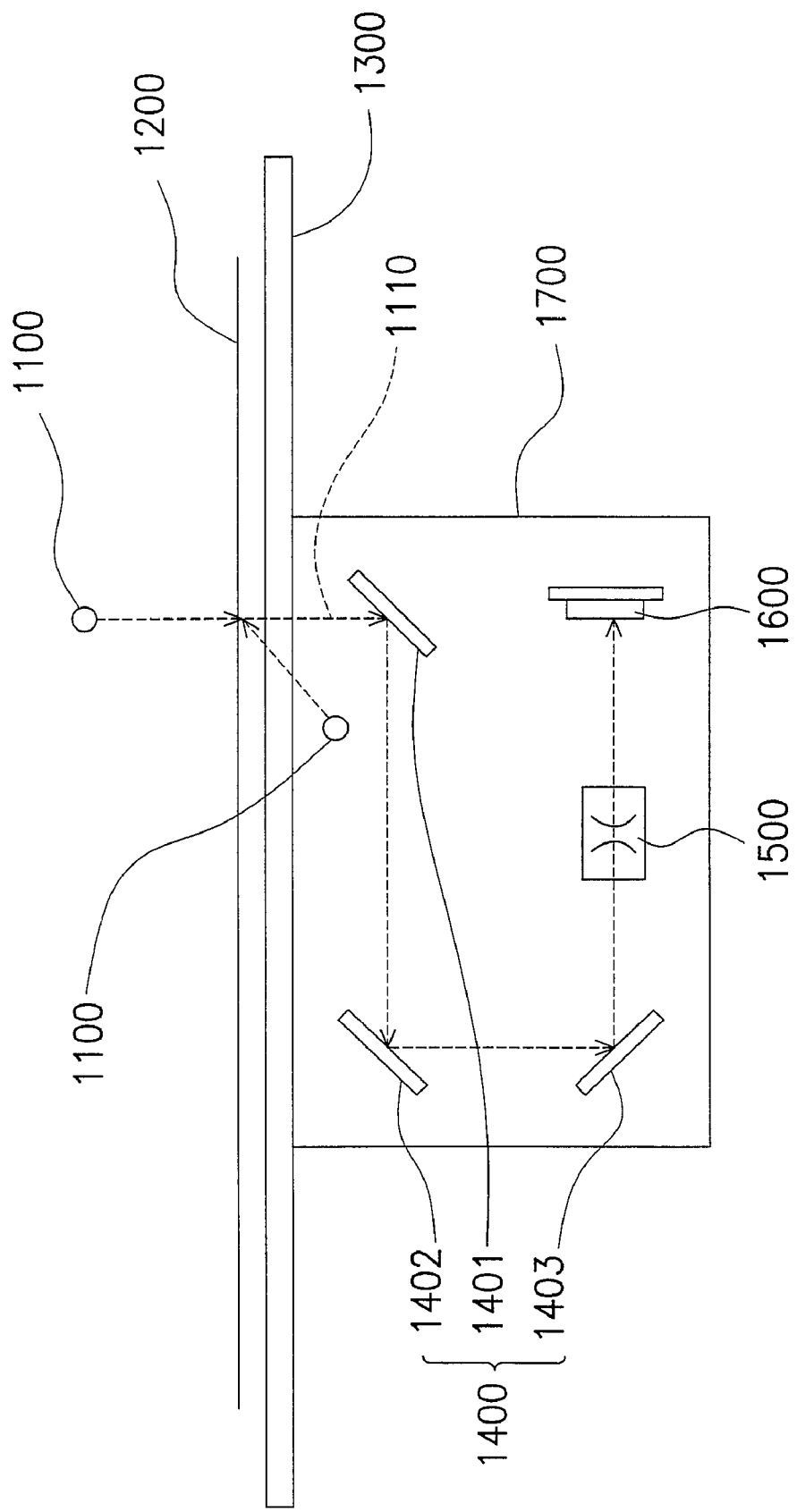
FIG. 3 is a cross-sectional view of an optical scan module according to the present invention.

FIG. 3 shows a cross-sectional view of an optical scan module according to the present invention. The optical scan module 1700 comprises a light source 1100, a reflection mirror set 1400, a lens set 1500 and an optical detector, for example, a charge-coupled device (CCD) 1600. While performing scan, the light source 1100 radiates a document disposed on a transparent board 1300. By reflection (where the light source 1100 is located under the transparent board 1300) or projection (where the light source 1100 is located over the transparent board 1300), an imaging light 1110 is obtained. The reflection mirror set 1400 is assembled by reflection mirrors 1401, 1402 and 1403 located on an optical path of the imaging light 1110, such that the imaging light 1110 is directed to the reflection mirror set 1400. The imaging light 1110 is then reflected from the reflection mirror set 1400 and transmitted to the lens set 1500. The lens set 1500 receives and displays the imaging light 1110 of the document 1200 reflected from the reflection mirror set 1400 on the charge-coupled device 1600.

Figure 4A:
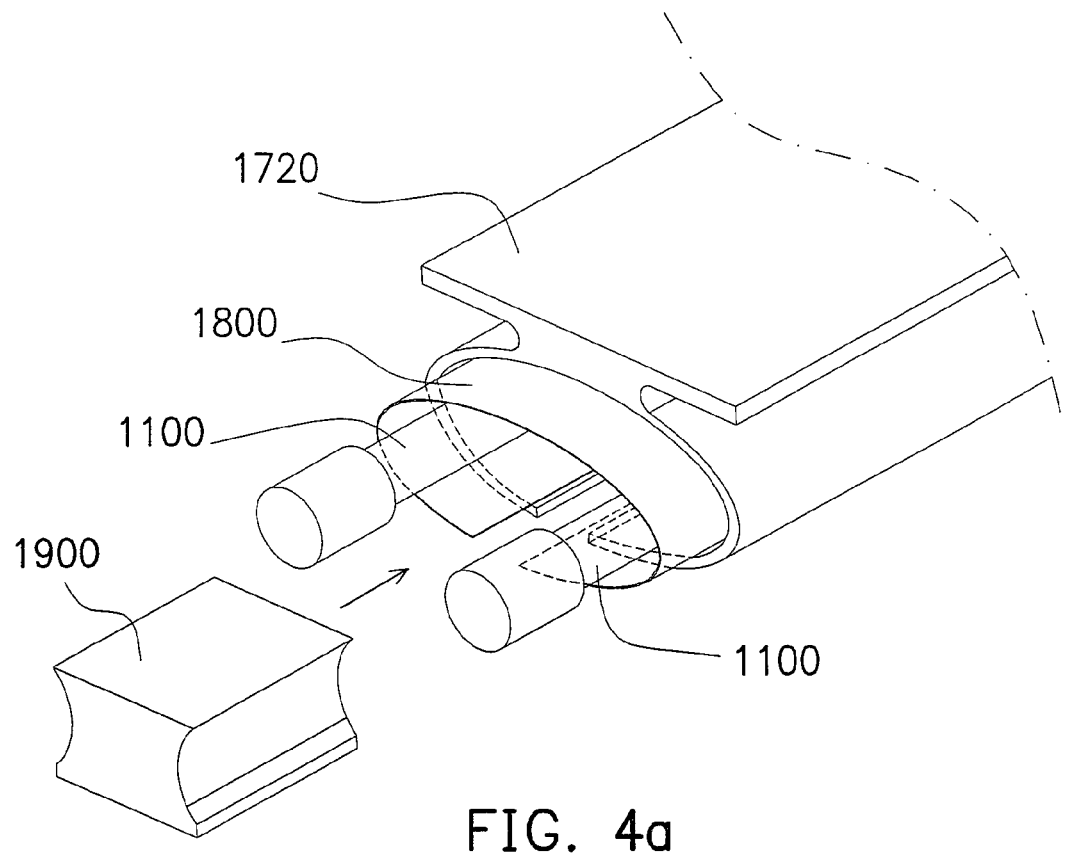
FIGS. 4a and 4b show the respective and side view of a light source of an optical scan module in one embodiment of the present invention.
Figure 4B:
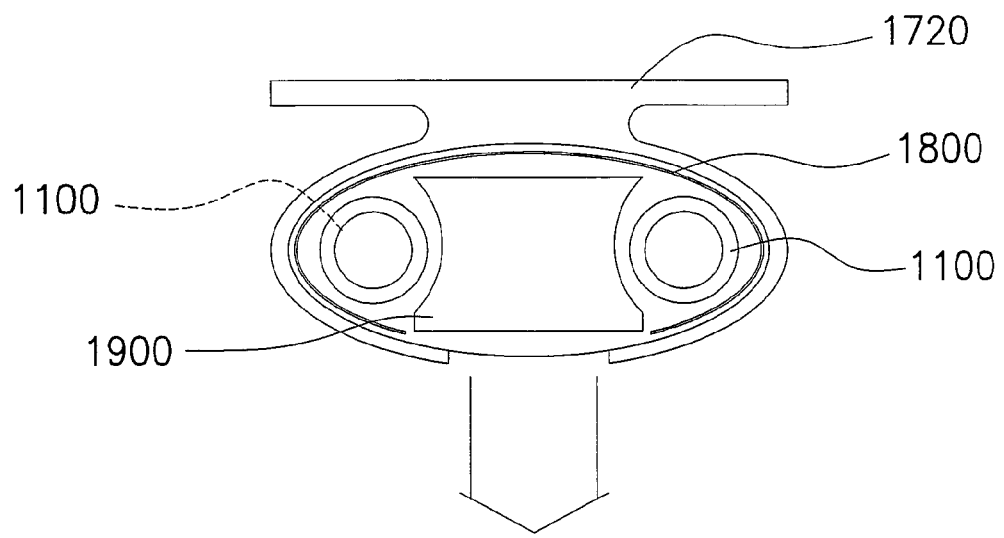

Referring to FIGS. 4a and 4b, the respective schematic drawing and the side view of the light source of the optical scan module provided by the present invention is shown. The light source 1100 includes at least one lamp tube (two lamp tubes as shown in FIGS. 4a and 4b, for example. The light source 1100 is mounted in the lamp base 1720 of the optical scan module 1700. The method of mounting the lamp tubes 1100 includes inserting a rubber plug 1900 at two sides of the lamp base 1720. To increase the intensity of the light source 1100, a reflector 1800 is allocated at a side opposing to the side where the document 1200 is radiated by the light source 1100. The light intensity of the light source 1100 is thus enhanced by reflection.

To improve the inconsistent intensities of the red, green and blue color light output of the charge-coupled device 1600, a reflector 1800 with a specific color is incorporated. For example, when red light is found to have insufficient intensity, a red reflector 1800 is used to enhance the output performance of red light. Similarly, when the intensity of the green light is insufficient, the reflector 1800 with green color is used to enhance the output performance of green light. If the intensity of the blue light is found insufficient, a blue reflector 1800 is applied to enhance the output performance of blue light. The intensity or brightness of the color is determined and adjusted by testing result.

In addition to generating reflected light in the specific color by the reflector 1800, the method for enhancing the performance of the specific color of the light source 1100 further comprises directly using a light source with such specific color. That is, if the red light output intensity of the charge-coupled device 1600 is found insufficient after a test, a red light source 1100 is used for compensating such insufficiency. If the green light output intensity of the charge-coupled device 1600 is insufficient, a green light source 1100 is used.

Similarly, when the blue light output intensity is insufficient, a blue light source 1100 is used.

Second Embodiment

Figure 5:
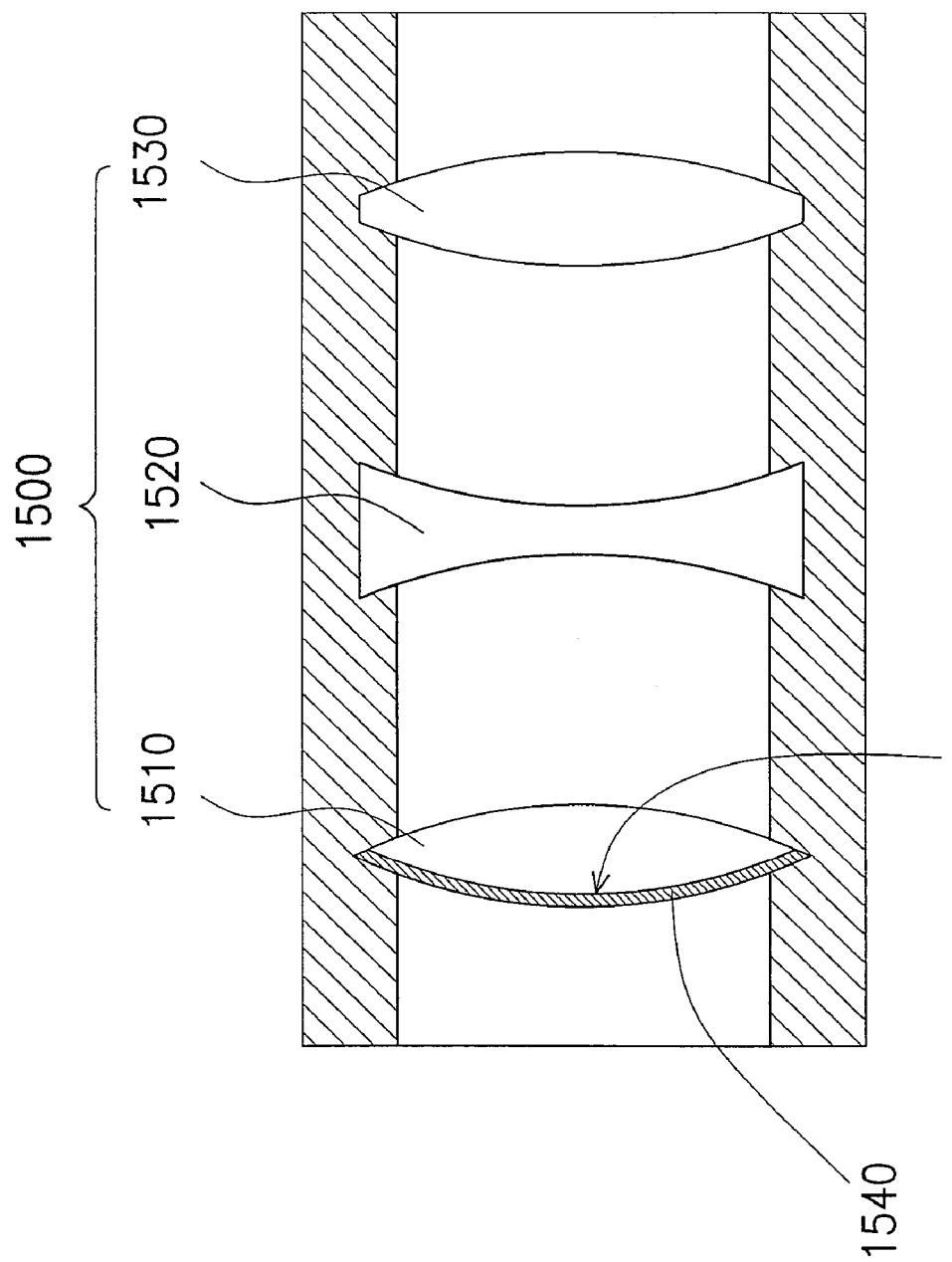
FIG. 5 is a side view showing a lens set of an optical scan module in a second embodiment of the present invention.

Referring to FIG. 5, a side view of a lens set of an optical scan module in a second embodiment of the present invention is shown. Similarly, the lens set 1500 includes a single lens format assembled by multiple lenses (1510, 1520 and 1530 in this embodiment). To improve the inconsistent intensities for red, green and blue lights, a surface 1512 of the lens 1510 is coated with a transparent plating film 1540 with a specific color. The method for forming the transparent plating film 1540 includes evaporation plating.

For example, when it is found that the charge-coupled device 1600 has insufficient intensity for red light, a red transparent plating film 1540 is formed to enhance the red light output performance of the light source. When the green light intensity output from the charge-coupled device 1600 is insufficient, a green transparent plating film 1540 is formed. When the blue light intensity of the charge-coupled device 1600 is insufficient, a blue transparent plating film 1540 is formed.

In addition to the plating film, the lens 1510 can also be dyed into the specific color to enhance output performance of the specific color of the light source 1100. If the output of red light of the charge-coupled device 1600 is insufficient, the lens 1510 is dyed into red color. The output performance of red light for the charge-coupled device 1600 can thus be enhanced. If the output of green light of the charge-coupled device 1600 is insufficient, the lens 1510 is dyed with green color, and when the output of blue light of the charge-coupled device is insufficient, the lens 1510 is dyed with blue color.

The above embodiment only incorporates a plating film on one surface of one lens, or dyes one lens. According to specific requirement, the plating film can be formed on a part of the surface, or the whole surface, of the lens. Further, plating films may also be formed on other lenses, or other lenses can also be dyed.

According to the above embodiment, the light source, reflector and lens set are modified to improve the inconsistent intensities of red, green and blue lights. In the above embodiments, three primary lights are used to explain the present invention. It is appreciated that the present invention may also be applied to compensation and correction of other colors for the light source.

The present thus has at least the following advantages:

(1) A reflector or a lens in a specific color, or a light source with this specific color is used to improve the performance of light in this specific color. Therefore, the inconsistence in intensity for light in different colors output from the charge-coupled device is improved.

(2) The performance of the light source in specific color is directly improved. Therefore, the compensation and correction step performed in the firmware after each scan is avoided to save time and cost.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

The invention claimed is:

1. A method comprising:
providing a document scanner having a light source configured to radiate a document to produce an imaging light and an optical detector configured to receive the imaging light;
providing a reflector at a first side of the light source opposing a second side of the light source from which a document is radiated, the reflector configured with a color selected to increase the intensity of the color of the imaging light, wherein the color is selected from the group of red, green, and blue;
radiating a document to obtain an imaging light; and
receiving the obtained imaging light by the optical detector.

2. An optical scan module, comprising:
a light source configured to radiate a document to obtain an imaging light;
a reflector disposed at a first side of the light source opposing a second side of the light source from which the document is radiated, the reflector having a color selected from a group consisting of red, green and blue colors, wherein the reflector is configured to increase the intensity of a particular color of the imaging light;
a reflection mirror set disposed in an optical path of the imaging light and configured to reflect the imaging light;
a lens set disposed in the optical path of the imaging light and configured to allow imaging light reflected from the reflection mirror set to pass therethrough; and
an optical detector disposed in the optical path of the imaging light and configured to receive imaging light that passes through the lens set.

3. An optical scan module, comprising:
means for radiating a document to obtain an imaging light;
means for increasing an intensity of a color of light emitted by the means for radiating the document, the means for increasing disposed at a first side opposing a second side of the means for radiating from which the document is radiated and the means for increasing having a color selected from a group consisting of red, green, and blue colors;
means for reflecting the imaging light, the means for reflecting disposed in an optical path of the imaging light; and
means for receiving the imaging light reflected by the means for reflecting, the means for receiving disposed in the optical path of the imaging light.

4. The optical scan module of claim 3, wherein the means for radiating a document comprises a light source.

5. The optical scan module of claim 3, wherein the means for increasing an intensity of a color of light emitted by the means for radiating the document comprises a reflector.

6. The optical scan module of claim 3, wherein the means for reflecting the imaging light comprises a reflection mirror set.

7. The optical scan module of claim 3, further comprising a lens set disposed in the optical path of the imaging light and configured to allow imaging light reflected from the means for reflecting to pass therethrough to the means for receiving.

8. The optical scan module of claim 3, wherein the means for receiving the imaging light reflected by the means for reflecting comprises an optical detector.

9. A scanner, comprising:
a platform configured to receive a document;
an optical scan module having:
a light source configured to radiate the document to obtain an imaging light;

a reflector disposed at a first side opposing a second side of the light source where the document is radiated, the reflector having a color selected from a group consisting of red, green and blue colors, wherein the reflector is configured to increase intensity of a particular color of the imaging light;

a reflection mirror set disposed in an optical path of the imaging light and configured to reflect the imaging light;

a lens set disposed in the optical path of the imaging light and configured to allow the imaging light reflected from the reflection mirror set to pass therethrough; and an optical detector disposed in the optical path of the imaging light and configured to receive the imaging light passing through the lens set; and a driving mechanism configured to drive the optical scan module along the platform to scan the document.

10. A color adjusting method for a scanner light source, comprising:

providing an optical scan module having a light source configured to radiate a document to obtain an imaging light and an optical detector configured to receive the imaging light and convert the received imaging light into red, green, and blue analog signals;

analyzing the red, green, and blue analog signals and determining which of the red, green, and blue analog signals has insufficient intensity; and providing a reflector at a first side of the light source opposing a second side of the light source from which the document is radiated, the reflector having a color effective to reflect and adjust the color of the imaging light sufficient to modify the red, green, and blue analog signals generated by the optical detector.

11. The color adjusting method of claim 10, further comprising providing a reflection mirror set in an optical path of the imaging light, the reflection mirror set configured to reflect the imaging light.

12. The color adjusting method of claim 10, further comprising providing a lens set in an optical path of the imaging light, the lens set configured to allow the imaging light to pass therethrough.

13. A scan module, comprising:

means for radiating a document to obtain an imaging light, the means for radiating having a first side and a second side opposite the first side, the second side being proximate the document and from which the document is radiated;

means for receiving the obtained imaging light; and means for increasing an intensity of a particular color of the imaging light emitted by the means for radiating the document, the means for increasing being proximate the first side of the means for radiating and opposite the radiated document, the means for increasing having a color effective to reflect and increase the intensity of the particular color.

14. The scan module of claim 13, further comprising means for reflecting the imaging light, the means for reflecting being disposed in an optical path of the imaging light between the means for radiating and the means for receiving.

15. The scan module of claim 14, wherein the means for reflecting comprises a reflection mirror set.

16. The scan module of claim 13, further comprising means for allowing the imaging light to pass therethrough, the means for allowing being disposed in an optical path of the imaging light between the means for radiating and the means for receiving.

17. The scan module of claim 16, wherein the means for allowing comprises a lens set.

18. The scan module of claim 13, wherein:

the means for radiating comprises a light source;

the means for receiving comprises an optical detector; and the means for increasing comprises a reflector.

* * * * *